2,914,425

METHOD FOR SOLDERING NORMALLY NON-SOLDERABLE ARTICLES

Joseph C. McGuire, Los Alamos, N. Mex., assignor to the United States of America as represented by the United States Atomic Energy Commission No Drawing. Application March 14, 1956
Serial No. 571,579

14 Claims. (Cl. 117—111)

This invention relates to methods for coating and joining materials and, in particular, to a method for making it possible to solder materials which those skilled in the art considered difficult or impossible to solder.

Many materials have been virtually impossible to coat with a well bonded metal coating. Surface properties are often such that these materials cannot be coated by electroplating, hot dipping, tinning with solder or other means. Or, where a material may be coated by, for example hot dipping, in cases where only a small area is to be coated protecting the rest of the surface against coating usually becomes a problem. The uses to which a good, simple coating process may be applied are many and there has been an urgent need for such a process since there are many materials which cannot be metal coated by any process and many others which cannot be coated by any simple, inexpensive process.

The usual method for soldering metal to metal, includes wetting or tinning the metal surfaces with a solder, usually in the presence of a carefully chosen flux. The metal pieces are then either "sweated" together or joined by spreading a common pool of solder over both pieces.

Since many metals or other materials now in use cannot be coated with other metals such as solder by the usual soft solder techniques due to surface properties which cannot be overcome by any flux, considerable effort has been advanced to find a satisfactory method to perform such soldering. The problem is generally that of removing an oxide or other impurity layer present on many base metals which prevents the solder or similar metal from wetting the base metal even though a flux may be used. Although all or nearly all metals oxidize, those which are solderable by the usual technique are metals on which the oxide forms slowly, so that once cleaned there is sufficient time to apply solder, or, in a few instances, fluxes are able to suppress rapid oxidation. Metals which oxidize rapidly cannot, as a rule, be soldered by the usual techniques. The present invention teaches a method of coating a surface with a metal layer so that subsequent soldering can be done and also provides a metal coating which prevents oxidation of the surface and protects the surface.

One method of the prior art for accomplishing this has been the use of a soldering tip which is oscillated at a rapid rate through mechanical coupling to a supersonic or ultrasonic sound wave generator. However, this equipment is expensive, cumbersome, and subject to maintenance problems and, furthermore, has been found not capable of soldering many materials which are solderable by the present invention. Furthermore, solder joints made by the supersonic method have been found to be weaker than those made by the method of the present invention.

By this invention solid materials including non-metals such as ceramics, glasses, woods and heat-set plastics may be coated for subsequent soldering to similar or dissimilar substances, with very simple apparatus, if they can stand the temperature of the molten solder without deleterious effects. The material coated preferably should have a melting point at least as high as the metal used to coat the material and a hardness comparable or greater than the metal used to coat the material.

The preferred embodiment of the present invention comprises rubbing the solid substance to be coated with a rotating wheel, said wheel having in combination abrasive properties and a fusible, ductile metal coating so that the surface to be coated is simultaneously rubbed free of oxide and friction coated with a metal such as a solderable metal. Flux is neither required, nor desirable.

It is therefore an object of this invention to provide a simple and inexpensive method for bonding a metal coating to solid dissimilar substances.

Another object of this invention is to provide a method for bonding a metal coating to ceramics.

Another object of this invention is to provide a simple and inexpensive method for bonding a metal coating to other metals.

Another object of the invention is to provide a simple and inexpensive method for bonding a metal coating to metals which oxidize readily.

Another object of this invention is to provide a method for preparing the surface of materials for soldering, where the material has heretofore been considered unsolderable.

Further objects of this invention will be apparent from the following specification and appended claims.

The preferred embodiment of the present invention is practiced by utilizing an abrasive means such as a hand grinder to rotate an abrasive wheel. A bar of a suitable coating metal, such as Wood's metal, is held against the rotating wheel to fill the cavities of the abrasive wheel and "load" the wheel with the coating metal. The surface of the base material to be coated is then rubbed with the "loaded" rotating wheel, thereby coating the surface with the soft coating metal. Even though the wheel is almost completely covered with the soft coating metal, it has been found that it is still abrasively effective for removing surface contaminants from the surface to be soldered. When the rotating wheel is rubbed on the surface considerable force is applied so that there is a burnishing action between the wheel and the surface. This action deposits a layer of soft coating metal upon the surface of the base material.

Other materials may be subsequently soldered to this prepared surface using any of the well-known means for melting the solder such as a soldering iron, Bunsen burner, hot plate, with conventional solders such as half and half (50% each Pb and Sn).

Although the exact phenomena which cause the soft metal to be deposited upon a base material are not clearly understood, apparently the soft coating metal melts by friction at the same time that the abrasive wheel removes surface contaminants from the base material and remains molten on the surface while the wheel continues to clean the surface of the material and thereby forms an adherent layer. Since the base material is then clean, a flux is not required as it appears that all metals will accept solder when the surface is perfectly clean without the need for flux or other chemical agents and non-metals accept a metal coating when applied by the method of this invention without the need for flux. It is known that the wheel must be rotating sufficiently fast, and appreciable pressure must be applied between the wheel and the base material.

The coating, when applied to a base metal, appears to be a cohesive bonded layer and holds to the base metal as tenaciously as a solder holds to easily solderable metals. The fact that the base metal is one that normally oxidizes readily does not apparently affect the holding power of the coating metal.

Another remarkable feature of this invention is that this method may be used for coating ceramics or glass with metal. The same technique is used as previously described except that the abrasive wheel may be operated at a lower speed (i.e. about 250 r.p.m. under load); however, it is assumed that the mechanism by which the coating is successful is different in this instance. Apparently the loaded wheel forces the soft metal into the pores of the ceramic or, when glass is being coated, apparently the wheel face abrades the glass so that it is possible for the soft metal to hold to the surface as the soft metal is deposited on the abraded area. It may also be that the clean glass furnishes a molecular bond for the coating metal. The bond is very good and on samples tested where a piece of metal has been soldered to a ceramic, the metal or the soldered joint will break before the solder will pull loose from the ceramic.

As previously indicated, Wood's metal is very satisfactory as a coating metal to be applied to the abrasive wheel but other metals will work with equal satisfaction. All of the low melting point fusible alloys appear suitable though certain ones are more appropriate for certain base materials than others. Tin-indium in a 50–50 mixture, by weight, is a very excellent coating metal and the higher melting point solders will work by slightly heating the abrasive wheel. Silver and gold will coat, but more local heat (by friction or otherwise) is required than for the soft solders. After the initial coating is applied by the method of this invention, any conventional solder may be used to perform satisfactory soldering, or more of the coating metal may be used to solder to the coating.

Following is a list of some of the useful coating metals which may be used for the preferred embodiment of this invention.

TABLE I

*Some of the fusible bonding metals*

| Melting Point, ° C. | Material | Composition, Percent by Wt. |
| --- | --- | --- |
| 38 | Cerrolow 105 | Bi 42.91, Pb 21.70, Sn 7.97, Cd 5.09, In 18.33, Hg 4. |
| 47.2 | Cerrolow 117 | Bi 44.7, Pb 22.6, Sn 8.3, Cd 5.3, In 19.1. |
| 47.2 | Cerrolow 117B | Bi 44.7, Pb 22.6, Sn 11.3, Cd 5.3, In 16.1. |
| 56.7 | Cerrolow 140 | Bi 47.5, Pb 25.4, Sn 12.6, Cd 9.5, In 5. |
| 57.8 | Cerrolow 136 | Bi 49, Pb 18, Sn 12, In 21. |
| 57.8 | Cerrolow 136B | Bi 49, Pb 18, Sn 15, In 18. |
| 61.1 | Cerrolow 147 | Bi 48, Pb 25.63, Sn 12.77, Cd 9.6, In 4. |
| 70 | Wood's Metal | Bi 50, Pb 25, Sn 12.50, Cd 12.50. |
| 70 | ...do | Bi 50, Pb 24, Sn 14, Cd 12. |
| 78.9 | Cerrolow 174 | Bi 57, Sn 17, In 26. |
| 91.9 | Bi-Pb-Cd | Bi 51.6, Pb 40.2, Cd 8.2. |
| 95 | Newton's Alloy | Bi 52.5, Pb 32, Sn 15.5. |
| 95 | ...do | Bi 50, Pb 31.25, Sn 18.75. |
| 95 | Darcet's Alloy | Bi 50, Pb 25, Sn 25. |
| 100 | Rose's Alloy | Bi 50, Pb 28, Sn 22. |
| 100 | ...do | Bi 46, Pb 20, Sn 34. |
| 115.6 | Cerroseal 35 | Sn 50, In 50. |
| 155 | Indium | 100% Indium. |
| 177 | Sn-Cd Eutectic | Sn 67.75, Cd 32.25. |
| 210 | Sn-Pb% | Pb 50, Sn 50. |
| 180 | Sn-Pb Eutectic | Sn 61.9, Pb 38.1. |

An example of how this invention might be practiced to solder a sheet of titanium to tantalum, which are two very difficult metals to solder, is given as follows: A 100 grit abrasive wheel about ¼″ diameter and ½″ long is attached to an 88 watt hand grinder and loaded with Wood's metal as heretofore explained. The loaded wheel is then rotated against the sheet of titanium on the region to be soldered. The pressure applied will reduce the speed of the wheel to about from 500 to 1000 r.p.m., and a layer of Wood's metal will be deposited on the titanium. This is repeated on the tantalum sheet. A better coating of the tantalum is obtained if the tantalum sheet is warmed to about 60° C. Then the two pieces of sheet metal are coated with conventional solder (such as half and half) and are brought together and joined by fusing and joining the two solder layers.

Cast iron may be soldered by coating with Wood's metal and then using half and half for the solder joint by the same method by which titanium was soldered.

Aluminum or aluminum alloys are coated by the same methods as titanium. The wheel can be coarser (75 grit) than that used on titanium. Wood's metal is an excellent coating metal.

Niobium can be coated best if the abrasive wheel is finer (200 grit) than that used on titanium. Wood's metal is excellent as the coating metal. A coarse wheel (100 grit) will work satisfactorily, however.

Vanadium can be coated by using a coarse wheel (100 grit), and, for subsequent soldering, it is recommended that the coating be heavier than for other base metals. Cerrolow 117B (see Table I) is also very good as a coating metal.

Molybdenum should be rubbed with a very heavily loaded abrasive, and after the coating begins to flow more coating metal is preferably applied to the abrasive. Again, Wood's metal is excellent; however, as with the other base metals coated, any of the coating metals may be used.

Other metals can be coated by the method used for titanium.

Zirconium boride may be soldered to boron carbide by first coating each with the method used for coating titanium, then applying to each half and half solder, and then sweating or otherwise soldering the two together. Other carbides, nitrides and borides, for example, tungsten carbide, and tantalum carbide have been successfully coated by the same techniques.

To solder to ceramics, for example a No. 18 copper wire to a ceramic disc, the wheel loaded with a coating metal is rubbed on the ceramic surface and a metal deposit will appear on the ceramic and hold very tenaciously. Conventional solder is applied and then the copper wire may be attached with a soldering iron. The solder joint, including the coating, has been found to be stronger than the wire.

To solder to wood, care must be taken not to char the wood, and the wood is carefully coated with Wood's metal by the methods described. Then a low melting point solder can be used to attach wires, etc., to the coated surface.

Bakelite can be coated by the same technique and with the same coating metal as applied to wood.

For production line type techniques, it has been found that a lager (1″ diameter) wheel with a flat end may be placed in a drill press, the flat end coated by rubbing with a stick of Wood's metal, or by dipping in molten Wood's metal, and then applied to the base metal by the drill press means. This applies a 1″ diameter solder-coated spot to the base metal. Other production methods familiar to those skilled in the art could also be used. A larger area may be coated by using a larger diameter wheel, or, a large area can be coated by rubbing the desired area with a suitably coated abrasive belt.

Another method by which a coating may be applied is to cover the area to be coated with a thin sheet (for example, 3 to 20 mils) of coating metal and bear down on the sheet with an uncoated wheel. The resultant action is similar to the other methods embraced by this invention, but serves to combine the steps of coating the wheel and abrading the surface of the base material with the wheel.

The substances which may be coated and subsequently soldered by this method are many. They include, for example, aluminum, antimony, beryllium, bismuth, carbon, cobalt, columbium, magnesium, molybdenum, tantalum, titanium, tungsten, uranium, vanadium, zirconium, glass, ceramics, metal borides, hydrides, carbides and nitrides, wood and thermoset plastics, as well as any substance which can tolerate the abrasive action and heat from the wheel. It is therefore understood that the foregoing list of examples is not limiting, as this invention may be used for many substances not so listed.

As noted earlier, the method of the present invention is also uniquely suitable for applying protective coatings on substances. Most of the coating metals usable have corrosion resistance and are ideal for this purpose. For example, lithium hydride may be coated with metal by the methods of this invention, whereas it is otherwise difficult to coat by usual methods as it is a nonconductor of electricity and must be handled in an inert atmosphere before coating.

Some of the features of this invention are enumerated below tho they are not to be considered limiting or all-inclusive.

Although the abrasive can be almost any form, and moved by hand or other common means, a hand grinder has proved to be a convenient abrasive means. Where a larger area is to be coated than can be done with a small hand grinder, a more powerful rotating means such as a hand drill can be used, and, of course, for production purposes other mechanical means such as sanding belts, etc., can be used. A 100 grit sintered abrasive is a good choice for all coating; however, any size grit will work and the abrasive can be in any convenient form. An emery or sandpaper has been found very effective.

The abrasive may be coated by rubbing the coating metal against the moving abrasive, or, the abrasive may be dipped in molten coating metal to coat it. Many coating metals are equally suitable, and, for any material coated, no one coating metal has been found to be superior. Any composition of Wood's metal has been found very suitable, and Cerroseal is also a very excellent coating metal.

In applying the coating, the coated abrasive is normally moved against the base material. However, the work may be moved against the abrasive with equal results. As previously noted, the base material can be covered with metal sheet and the uncoated abrasive applied to the sheet. When a high temperature solder is being used, it is helpful to warm the wheel or the base material to a temperature up to the melting point of the coating metal or slightly more. The base material can be warmed by placing it on a hot plate or heater, or by infra-red lights, etc. The abrasive can be heated by suitable means.

When this invention is practiced as a basis for soldering, the final joint has strength compatible with the strength of the solder used, even tho the coating metal is weaker. Apparently the alloying action of the solder to the coating metal is sufficient to raise the strength of the joint to that of the solder.

Therefore, the invention is not limited by the preferred embodiment or by the theory suggested, but is limited only by the appended claims.

What is claimed is:
1. A method for preparing the surface of a non-solderable article for soldering by coating the surface of the article with a bonded solderable metal layer comprising the steps of coating a grinding member with the bonding metal, pressing said coated grinding member and the surface of said article together while maintaining relative movement therebetween to thereby affix an adherent deposit of said bonding metal on said article.

2. The method of claim 1 in which said grinding member is rotated.

3. The method of claim 1 in which said coating metal is Wood's metal.

4. The method of claim 1 in which said coating metal is an alloy consisting of equal weights of tin and indium.

5. A method for preparing the surface of non-solderable base metals for soldering by providing a cohesive surface layer of solder wettable metal, comprising coating a grinding member with said solder wettable metal and rubbing said grinding member against the surface of said base metal to thereby affix a coherent coat of said solder wettable metal to the surface of said base metal.

6. A method for preparing the surface of non-solderable articles for soldering which comprise the steps of preparing a grinding member having at least its surface coated with cutting particles by applying soft solder to at least a part of the working surface of the grinding member and rotating said prepared member against the surface of said article to thereby affix a coherent coat of said soft solder to the surface of said article.

7. The method of claim 6 wherein said member is a grinding wheel.

8. The method of claim 6 wherein the article is a metal.

9. The method of claim 6 wherein the solid substance is a ceramic.

10. The method of claim 6 wherein the solid substance is a thermoset plastic.

11. The method of claim 6 wherein the solid substance is wood.

12. The method of claim 6 wherein said grinding member is heated.

13. The method of claim 6 wherein said article is heated.

14. A method for providing a solderable coating on a non-solderable article comprising the steps of preparing the surface of a grinding member by applying Wood's metal to at least a part of the working surface of said grinding member and pressing and rotating said prepared member against the surface of said non-solderable article thereby affixing a solder wettable coating to the surface of said article for the subsequent application of soft molten solder to attach said article to other solderable elements.

References Cited in the file of this patent

UNITED STATES PATENTS

| | | |
|---|---|---|
| 527,210 | Margot | Oct. 9, 1894 |
| 661,650 | Thurston | Nov. 13, 1900 |
| 802,692 | Horton | Oct. 24, 1905 |
| 936,389 | Wadsworth | Oct. 12, 1909 |
| 1,598,302 | Norton | Aug. 31, 1926 |
| 1,964,671 | Nesbitt | June 26, 1934 |
| 2,285,583 | Jennings | June 9, 1942 |
| 2,292,026 | Gillett | Aug. 4, 1942 |
| 2,314,902 | Shephard | Mar. 30, 1943 |
| 2,490,548 | Schultz | Dec. 6, 1949 |
| 2,618,572 | Parrish | Nov. 18, 1952 |
| 2,667,431 | Burnside | Jan. 26, 1954 |

FOREIGN PATENTS

| | | |
|---|---|---|
| 229,269 | Great Britain | July 16, 1925 |
| 359,559 | Germany | Sept. 23, 1922 |